UNITED STATES PATENT OFFICE.

MAX BUCHNER, OF MANNHEIM-WALDHOF, GERMANY.

METHOD OF MANUFACTURING AND TREATING COMPOSITE ALUMINIUM OXIDS.

No. 883,286.      Specification of Letters Patent.      Patented March 31, 1908.

Application filed May 10, 1907. Serial No. 372,911.

*To all whom it may concern:*

Be it known that I, MAX BUCHNER, a subject of the German Emperor, residing at Mannheim-Waldhof, in the German Empire, have invented a new and useful Method of Manufacturing and Treating Composite Aluminium Oxids; and I do hereby declare that the following is a full, clear, and exact description of the invention, which will enable others skilled in the art to which it appertains to make and use the same.

The manufacture of so-called composite aluminium oxids has hitherto been effected by smelting mixtures of aluminium oxid and other oxids.

The applicant has made the surprising observation that the manufacture of these compounds, hitherto only obtainable by smelting, can be also accomplished by heating molten aluminium oxid with compounds of the metals or metalloids or metals and metalloids.

The process is carried out as follows, that is to say, ground molten artificial or natural aluminium oxid mixed with ground oxygen compounds with or without the addition of binding materials is molded to the desired shape and then heated. The reaction takes place at temperatures which are considerably below the fusing point. The degree of fineness of the ingredients can be varied within wide limits. Also the proportions of molten aluminium oxid and oxygen compounds can be largely varied. It is thus possible to obtain compounds of very different properties and capable of a variety of applications. Furthermore, further oxygen compounds can be introduced into compounds of aluminium oxid and oxygen compounds obtained by smelting by mere admixture and heating. If, for example, a mixture of magnesium oxid and aluminium oxid is in question chromium oxid or copper oxid can be added thereto.

The following examples illustrate the mode of carrying out the invention:—

1. *Iron - magnesium - silicon - aluminium - oxid.—*

8.45 parts by weight of $Fe_2O_3$, grain 120,
     40.00 parts by weight of MgO grain 0,
     10.71 parts by weight of $SiO_2$ grain 0,
     81.00 parts by weight of fused aluminium oxid grain 0.

These ingredients are mixed together, made into a paste with water, formed into bricks and then burned.

2. *Chromium-iron-magnesium-aluminium oxid.—*

.95 parts by weight of fused chromium oxid-aluminium oxid grain 120,
     8.2 parts by weight of iron oxid, grain 120,
     40.00 parts by weight of magnesium oxid, grain 0.

These ingredients are treated as under Example 1, molded and burned.

3. *Copper-aluminium oxid.—*

79 parts by weight copper oxid, grain 0,
     102 parts by weight fused aluminium oxid grain 120,
     15 parts by weight kaolin.

These ingredients are mixed, worked into a paste with water, formed into bricks and burned.

By "grain 0" in the above examples is meant that the material is reduced to a condition of dust or powder. "Grain 120" is used to indicate that the material is reduced to a condition in which the particles are of the size of fine sand. "Grain 60" indicates an intermediate condition of fineness between grain 0 and grain 120.

The new process has the advantage that it is not necessary as hitherto to fuse the various components of any aluminium compound to be obtained but only to bring one of them into the molten condition. By this means it will be possible when, for example, an electric current is employed for fusing, to replace the costly electrical energy by the cheaper heat of chemical combinations and, at the same time to avoid by-reactions which are set up by the chemical action between easily reducible oxids and carbon electrodes. For example, iron-copper-chromium oxid cannot be treated without difficulty by reason of the fact that it is easily reduced and of its high fluidity. At the same time the new process permits of the manufacture of compounds from their components and burning the articles formed therefrom (see Example 3); in this way the separate smelting hitherto considered as absolutely necessary is avoided and utensils are obtained which are of equal technical value.

The shrinkage under burning and the binding capacity of ceramic masses prepared by the above described process sometimes require reduction. In this case the oxid mixture is first burned and ground to a suitable extent and employed as chamotte. The following example illustrates this:—

4.40 parts by weight of magnesia, grain 0.
102 parts by weight of fused aluminium oxid, grain 0.
284 parts by weight of the product by burning 1 part by weight of magnesia and 2.5 parts by weight of fused chromium oxid aluminium oxid, grain 60,
20 parts by weight of kaolin,
10 parts by weight of silicic acid.

It will be obvious that oxid mixtures used as chamotte also contain ceramic binding substances.

Having now particularly described and ascertained the nature of my said invention and in what manner the same is to be performed, I declare that what I claim is:—

A process for the manufacture of combinations of fused aluminium oxid and oxygen compounds of the metals or metalloids or metals and metalloids characterized (1) by the arrangement that fused aluminium oxid is mixed with the said oxygen compounds with or without inorganic or organic binding materials and is heated (2) by the arrangement wherein an already burned mixture of fused aluminium oxid and other oxids in the grain condition is mixed with aluminium oxid, one or more oxids with or without binding materials, burned and molded.

MAX BUCHNER.

Witnesses:
H. W. HARRIS,
JAS. H. LEUTE.